United States Patent
Liu et al.

(10) Patent No.: US 9,674,282 B2
(45) Date of Patent: Jun. 6, 2017

(54) SYNCHRONIZING SLM STATUSES OF A PLURALITY OF APPLIANCES IN A CLUSTER

(71) Applicant: INTERNATIONAL BUSINESS MACHINES CORPORATION, Armonk, NY (US)

(72) Inventors: Jeffrey Ch Liu, Taipei (TW); Hao-Ting Shih, Taipei (TW); Joey Hy Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 13/960,069

(22) Filed: Aug. 6, 2013

(65) Prior Publication Data

US 2014/0095701 A1     Apr. 3, 2014

(30) Foreign Application Priority Data

Sep. 28, 2012 (TW) .............................. 101136130 A

(51) Int. Cl.
  *H04L 29/08*     (2006.01)
  *H04L 12/26*     (2006.01)
  *H04L 12/24*     (2006.01)

(52) U.S. Cl.
  CPC ...... *H04L 67/1095* (2013.01); *H04L 41/0893* (2013.01); *H04L 43/0817* (2013.01); *H04L 41/5009* (2013.01)

(58) Field of Classification Search
  CPC ....... H04L 47/10; H04L 47/127; H04L 47/18; H04L 47/263; H04L 47/19; H04L 47/283; H04L 67/1085; H04L 67/104; H04L 67/22; H04L 67/10; H04L 67/1004; H04L 67/1029; H04L 41/0233; H04L 41/042;
  (Continued)

(56) References Cited

U.S. PATENT DOCUMENTS 6,128,642 A * 10/2000 Doraswamy ............ G06F 9/505
                                                         709/201
6,816,732 B1 * 11/2004 Farley .................... H04W 28/08
                                                         370/328
(Continued)

FOREIGN PATENT DOCUMENTS

TW       201220767 A      5/2012
TW       201238290 A      9/2012

OTHER PUBLICATIONS

Shen et al., "Integrated Resouce Management for Cluster-based Internet Services", 2002, 5$^{th}$ USENIX Symposium on Operating System Design and Implementation, ACM.*

(Continued)

*Primary Examiner* — Vivek Srivastava
*Assistant Examiner* — Todd L Barker
(74) *Attorney, Agent, or Firm* — Law Office of Jim Boice

(57) ABSTRACT

A method, system, and/or computer program product synchronizes Service Level Monitoring (SLM) statuses of a plurality of appliances in a cluster. A token, which comprises a global SLM data and loading distribution information, is received at a first appliance. The global SLM data and loading distribution information of the token is retrieved from the token. The token is updated with local statistics for the first appliance. The updated token is then passed to a next appliance.

3 Claims, 9 Drawing Sheets

(58) Field of Classification Search
CPC ... H04L 41/0853; H04L 41/142; H04L 41/22; H04L 43/00; H04L 69/329; H04L 12/5695; H04L 29/06; H04L 67/1095; H04L 41/0893; H04L 41/5009; H04L 43/0817; G06F 11/3476; G06F 11/30; G06F 11/34; G06F 11/3466; G06F 11/3409; G06F 9/466; H04W 28/08
USPC ........................................................ 709/224
See application file for complete search history.

(56) References Cited

U.S. PATENT DOCUMENTS

| | | | | |
|---|---|---|---|---|
| 7,379,994 | B2* | 5/2008 | Collazo | H04L 41/0233 |
| | | | | 702/182 |
| 7,693,996 | B2* | 4/2010 | Wexler | G06F 9/5083 |
| | | | | 702/186 |
| 7,831,708 | B2 | 11/2010 | Anstey et al. | |
| 7,925,755 | B2 | 4/2011 | Diep et al. | |
| 7,962,582 | B2 | 6/2011 | Potti et al. | |
| 2003/0118029 | A1 | 6/2003 | Maher et al. | |
| 2006/0277317 | A1* | 12/2006 | Clark | G06Q 10/06 |
| | | | | 709/235 |
| 2008/0235379 | A1 | 9/2008 | Monette | |
| 2009/0265458 | A1* | 10/2009 | Baker | H04L 47/10 |
| | | | | 709/224 |
| 2009/0313273 | A1 | 12/2009 | Wexler et al. | |
| 2010/0058436 | A1 | 3/2010 | Maes | |
| 2011/0010445 | A1 | 1/2011 | Das et al. | |
| 2011/0320517 | A1* | 12/2011 | Zhang | H04L 12/5885 |
| | | | | 709/201 |
| 2012/0117605 | A1 | 5/2012 | Miao et al. | |
| 2013/0198363 | A1* | 8/2013 | Kolluru | H04L 67/22 |
| | | | | 709/224 |
| 2014/0012906 | A1* | 1/2014 | Teja | H04L 67/104 |
| | | | | 709/204 |

OTHER PUBLICATIONS

Anonymous, "Service Level Monitoring Enforcement for Services Gateways in an SOA", IP.COM, IPCOM000190548D, Dec. 4, 2009, pp. 1-3.

* cited by examiner

| | current throughput (TPS) | processing count | current threshold count |
|---|---|---|---|
| appliance A | 50 | 3 | |
| appliance B | 30 | 3 | 5 |
| appliance C | 20 | 1 | |

| | current throughput (TPS) | processing count (Token X) | current threshold count |
|---|---|---|---|
| appliance A | 30 → 40 | 3 → 4 | |
| appliance B | 20 | 4 | 5 (from B) + 4 (from A) = 9 (to C) |
| appliance C | 50 | 6 | |
| appliance D | 0 | 0 | |
| appliance E | 0 | 0 | |

520

| | current throughput (TPS) | processing count (Token Y) | current threshold count |
|---|---|---|---|
| appliance A | 0 | 0 | |
| appliance B | 0 | 0 | |
| appliance C | 50 | 3 | 4 (from D) + 1 (from E) = 5 (to C) |
| appliance D | 40 | 4 | |
| appliance E | 20 → 10 | 1 → 2 | |

| | current throughput (TPS) | processing count (Token X) | current threshold count |
|---|---|---|---|
| appliance A | 40 | 4 | |
| appliance B | 20 | 4 | 9 (from A) + |
| appliance C | 50 → 30 | 6 → 7 | 3 (from C) + |
| appliance D | 0 → 40 | 0 → 4 | 5 (from Y) = |
| appliance E | 0 → 10 | 0 → 2 | 17 (to A) |

540

| | current throughput (TPS) | processing count (Token Y) | current threshold count |
|---|---|---|---|
| appliance A | 0 → 40 | 0 → 4 | |
| appliance B | 0 → 20 | 0 → 4 | 5 (from E) + |
| appliance C | 50 → 30 | 3 → 4 | 3 (from C) + |
| appliance D | 40 | 4 | 9 (from X) = |
| appliance E | 10 | 2 | 17 (to D) |

FIG. 5c

SYNCHRONIZING SLM STATUSES OF A PLURALITY OF APPLIANCES IN A CLUSTER

This application is based on and claims the benefit of priority from Taiwan Patent Application 101136130, filed on Sep. 28, 2012, and herein incorporated by reference in its entirety.

BACKGROUND

The present invention relates to enhancement of appliance network efficiency, and more particularly, to a method and apparatus for enhancing appliance network efficiency of an appliance network having plenty service level monitoring (SLM) data.

Unlike general-purpose computer devices, an appliance is typically designed to serve a specific purpose or provide a specific service and thus is more robust. Compared with general-purpose computer devices, "appliances" are relatively "closed"—their specific operating systems and applications (or drivers) vary with their intended purposes and services.

An appliance, such as an access point, a digital TV set-top box, or a network file-sharing server, performs a specific transaction for serving a specific purpose. For sophisticated appliances, please refer to IBM® WebSphere® DataPower Series SOA Appliances or Tivoli® ISS Appliances® ("IBM," "WebSphere," and "Tivoli" are registered trademarks in the possession of International Business Machine in the United States and/or other countries).

In general, there is a certain degree of quality requirement of information services in terms of response time, throughput (TPS), etc. It is necessary that, once a threshold of a specified (that is, monitored) indicator is reached, the system infrastructure of an information service will have to provide a mechanism for measuring the current status and responding appropriately to thereby ensure the service quality expected by users. To allow messages to be received by and sent from a network, appliances (such as Datapower) implement a well-known service level monitoring (SLM) technique, which is usually implemented as an SLM strategy (policy) for use in monitoring major indicators to thereby assist a network administrator in identifying a problem instantly and giving an appropriate response.

According to the prior art, an appliance has an SLM module being executed to monitor the number of input messages received by the appliance and having a specific header and process the messages according to an instant sanction on SLM status synchronization. For example, the SLM module executes a specified action as soon as the quantity reaches a specified threshold. The specified action is queuing (or known as shaping), rejecting (or known as throttling), or passing (or known as notifying).

By synchronizing SLM statuses in a cluster formed by a plurality of appliances, an SLM strategy can be shared and implemented to process traffic of load balance of resources of the same target. A plurality of appliances in the same cluster (or known as peer group) has the same SLM strategy (or rule), and SLM data are shared by and between the appliances, thereby enabling exchange of SLM data between the appliances in the cluster. To synchronize SLM statuses of the appliances in the cluster, each appliance has to send its own SLM data to the other appliances. The SLM data can be sent by unicast or multicast.

However, in case of a high load, plenty of SLM data will have to be sent, thereby resulting in overwhelming traffic overhead and even network congestion. For the perspective of an SLM-based business-critical appliance, a trade-off between SLM reliability and network efficiency is likely to have a great impact on business.

SUMMARY

A method, system, and/or computer program product synchronizes Service Level Monitoring (SLM) statuses of a plurality of appliances in a cluster. A token, which comprises a global SLM data and loading distribution information, is received at a first appliance. The global SLM data and loading distribution information of the token is retrieved from the token. The token is updated with local statistics for the first appliance. The updated token is then passed to a next appliance.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 2b is a schematic view of a form that describes information carried by a token according to an embodiment of the present invention;

FIGS. 5b, 5c are tables of examples of transmitting a multi-token between appliances in a cluster according to the second embodiment of the present invention.

DETAILED DESCRIPTION

Figure 1:
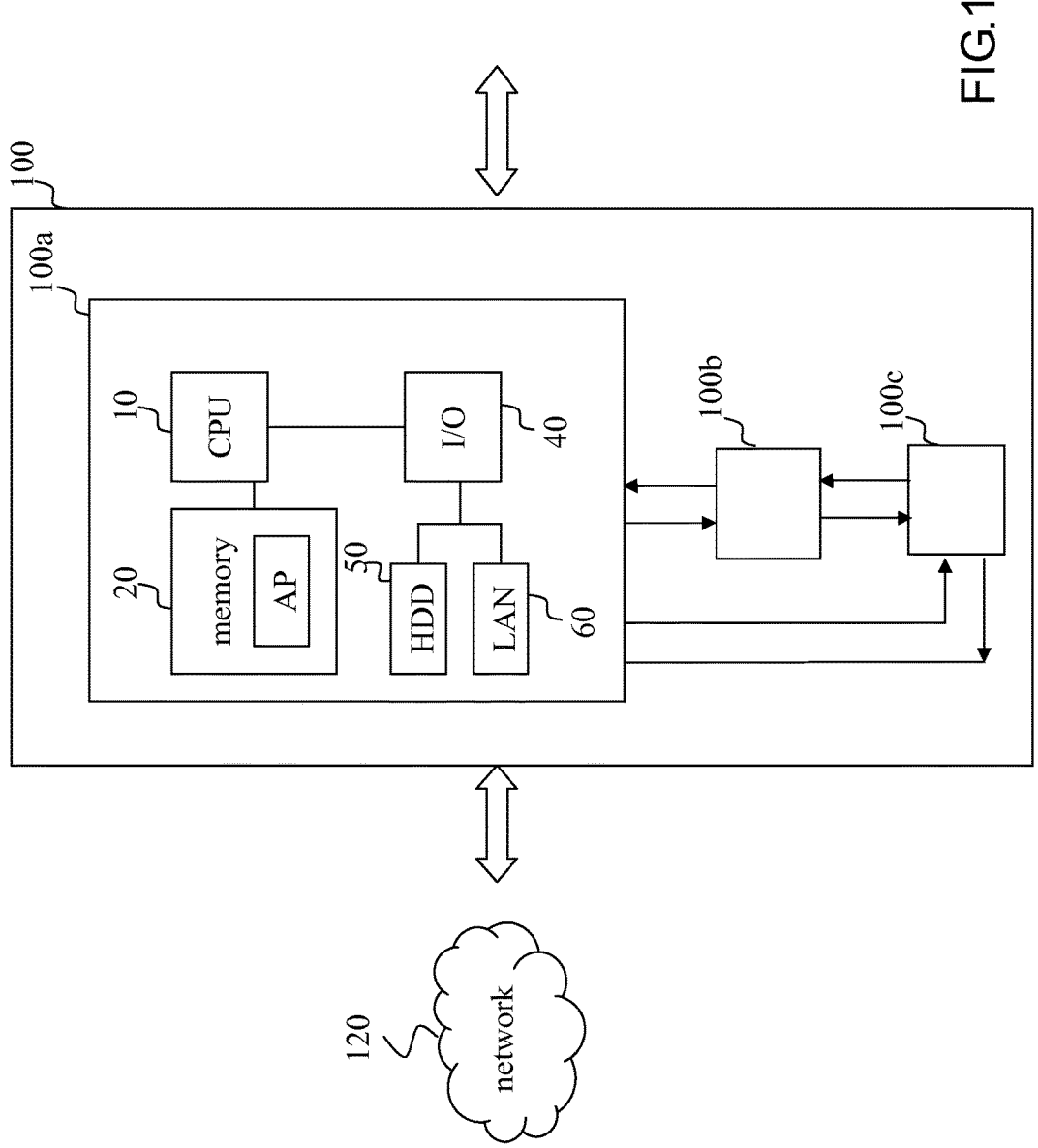
FIG. 1 is a schematic block diagram of a hardware environment of a cluster containing a plurality of appliances according to an exemplary embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1 through FIG. 5d, appliances, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Hardware Environment>

Referring specifically now to FIG. 1, there is shown a schematic block diagram of a hardware environment of a cluster containing a plurality of appliances according to an exemplary embodiment of the present invention. In an embodiment, the cluster 100 comprises three appliances 100a, 100b, 100c. The hardware framework of the appliances is similar to that of IBM WebSphere DataPower Series SOA Appliances or Tivoli ISS Appliances.

In an exemplary embodiment, each of the appliances 100a, 100b, and 100c includes: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way and thus having less or more other devices or components.

The plurality of appliances 100a, 100b, 100c in the cluster 100 passes a client's message received via a network 120 to a backend application on a subsequent network server. To synchronize the SLM statuses of a plurality of appliances in the cluster, each appliance sends its own SLM data to the other appliances by unicast or multicast.

Referring to FIG. 1, each of the information appliances 100a, 100b, and 100c comprises a processor 10, a memory 20, and an input/output (I/O) unit 40. The input/output (I/O) bus is a high-speed serial bus, such as a PCI-e bus, or any other bus structure. It is also feasible for the input/output (I/O) bus to get connected in any other ways directly by means of components interconnected or by means of an additional card. The input/output (I/O) unit 40 can also be coupled to a hard disk drive 50 or a local area network (LAN) adaptor 60. With the LAN adaptor 60, the information appliance 100 communicates with a user-end computer via a network cable 70 and a network (not shown). The memory 20 is a random access memory (RAM), a read-only memory (ROM), or an erasable programmable read-only memory (EPROM or Flash memory). The memory 20 stores an operating system, a program code of a dedicated application AP, and various information. An operating system is executed on the processor 10 to coordinate and provide various component controls in the information appliance 100. The processor 10 accesses the memory 20 so as to execute an application AP.

A primary application AP includes an SLM token processing module of the present invention. The SLM token processing module includes a program module and instruction. The program module and instruction implement an SLM strategy expectedly to monitor major indicators, help the network administrator identify the problem instantly, and respond appropriately. The SLM token processing module is implemented in the form of a module inside an application or a daemon. However, in another embodiment, the SLM token processing module is implemented in the form of any other program. The SLM token processing module includes a code of a program depicted in FIG. 3 and FIG. 5 and described below.

Persons skilled in the art understand that the hardware of the appliances 100a, 100b, 100c in FIG. 1 varies with embodiment, and can be supplemented by or replaced with another internal hardware or peripheral apparatus, such as Flash ROM, equivalent non-volatile memory, or CD-ROM.

SLM Token Processing Module

Single Token

Figure 2A:
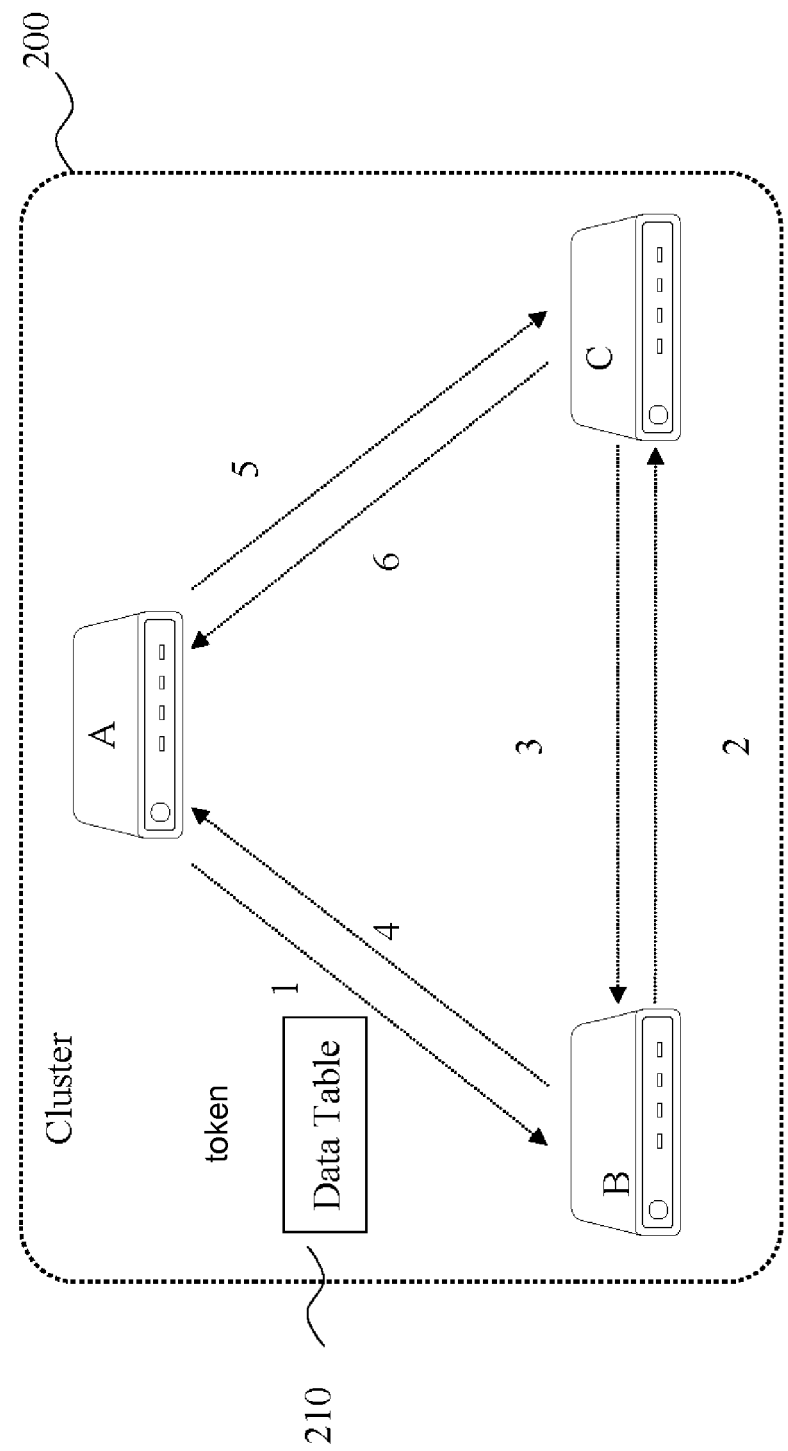
FIG. 2a is a schematic view of transmitting a token between all the appliances in the same SLM cluster according to an embodiment of the present invention.

Referring to FIG. 2a, there is shown a schematic view of transmitting a token 210 between all the appliances in the same SLM cluster 200 according to an embodiment of the present invention. As shown in the diagram, in the cluster, there is only one token passed between appliances in the order 1 to 6 to exchange the current statuses of the appliances and thereby finish synchronizing the SLM statuses of the plurality of appliances in the cluster. Hence, the present invention reduces greatly the quantity of messages exchanged during the synchronization of SLM statuses of a plurality of appliances in the cluster and solves the known problem with overwhelming traffic overhead.

The token carries global SLM data (SLM statistics) and loading distribution information of the cluster and thereby enables the owner of each token to implement an SLM strategy expectedly and hand over the token to the next appliance most likely to reach a threshold of a monitored indicator r. The global SLM data comes in the form of a threshold of a monitored indicator, that is, an SLM threshold count (TC), whereas the loading distribution refers to the current throughput (TPS) of the messages of each appliance, as indicated by the form shown in FIG. 2b.

The current SLM threshold count indicates the current total of a monitored indicator of each appliance in the cluster and thus is also known as an accumulated threshold count. If this value is larger than the threshold of a monitored indicator, the network administrator will respond appropriately.

The attribute of the current throughput is to track the latest average throughput of each appliance in the cluster. After receiving a token, an appliance updates the token with the current throughput of the appliance and passes the token to the next appliance. Due to the token, each appliance is informed of the current throughput of any other appliance.

The attribute of a processing count is to record the number of instances where an appliance has received and updated a token.

The form shown in FIG. 2b indicates that the cluster has therein three appliances, namely appliance A, appliance B, and appliance C. Appliance A currently has an average throughput of 50 TPS and has received and updated a token thrice.

In an embodiment of the present invention, a token is routed to the appliance that has the least PC ratio according to the loading distribution information and SLM data. The PC ratio refers to the ratio of a processing count to the current throughput.

An appliance of a lower PC ratio either has higher message throughput than any other appliance or has not received any token for a while and thus its processing count remains low. The rationale of this embodiment of the present invention is to allow an appliance of higher throughput to process the token more often than the other appliances, because higher throughput has much more influence on the accumulated throughput of appliances in a cluster. For example, in the situation where the SLM strategy requires that "if more than 200 transactions are received within three seconds, each appliance will reject inputting transactions." In this situation, an appliance of higher throughput (such as 50 TPS) will process a token more often than the other appliances.

The token passing mechanism of the present invention is not limited to the above embodiments. For example, it is also feasible not to give considerations to the current throughput of each appliance but to pass a token in sequence to thereby synchronize the SLM statuses of a plurality of appliances in the cluster.

Figure 3:
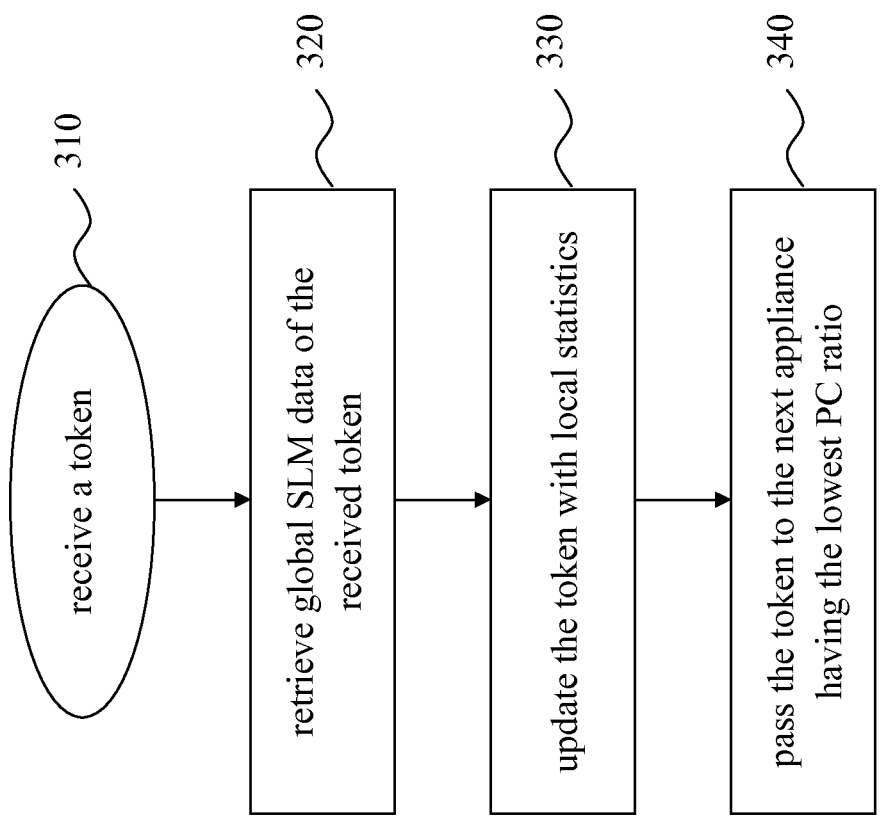
FIG. 3 is a flow chart of a method for use with an SLM token processing module according to an embodiment of the present invention.
Figure 4:
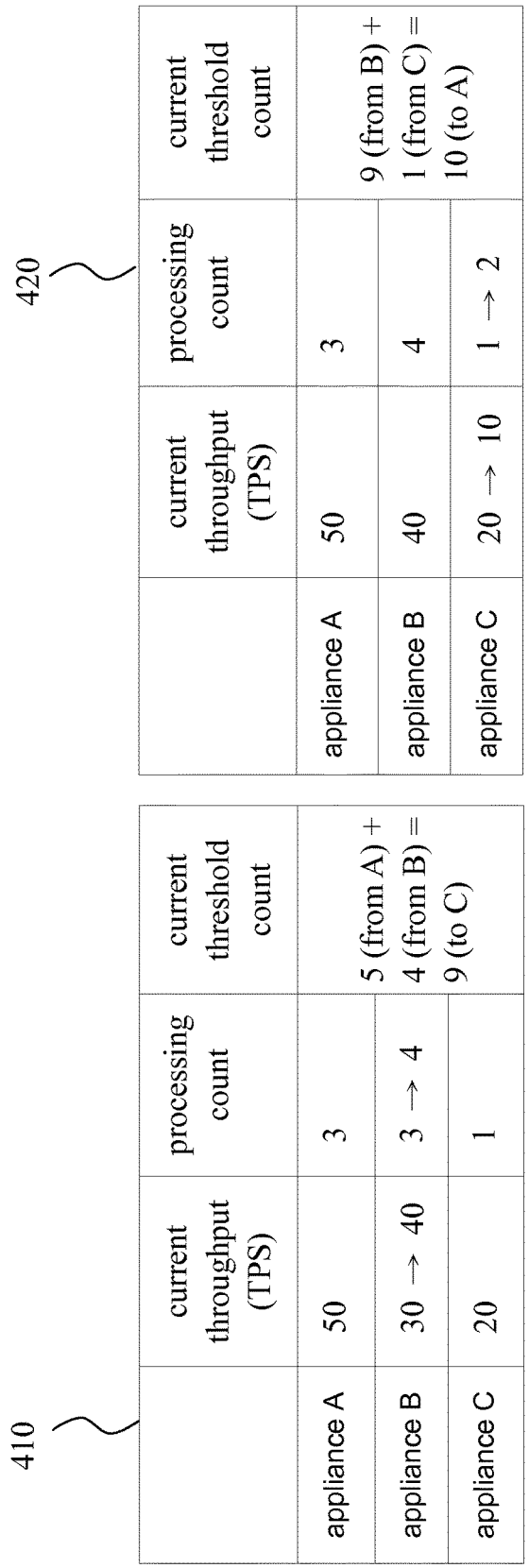
FIG. 4 is a table of examples of transmitting a single token between appliances in a cluster according to an embodiment of the present invention.

Referring to FIG. 3, there is shown a flow chart of a method for use with an SLM token processing module according to an embodiment of the present invention. An embodiment of the present invention is illustrated with FIG. 3 and FIG. 4. Referring to FIG. 4, there is shown a table of examples of transmitting a single token between appliances in a cluster according to an embodiment of the present invention.

Step 310: receiving a token by an appliance. Referring to FIG. 4, it is assumed that appliance A is currently sending a token to appliance B.

Step 320: retrieving a global SLM data (SLM statistics) of the received token. Referring to FIG. 4, after receiving a token, appliance B retrieves from the token the accumulated threshold count collected by appliance A, that is, the current SLM threshold count (=5) of the token.

Step 330: updating the token with local statistics. Each appliance records the SLM threshold count (TC) that occurs from the point in time when the preceding token is received to the point in time when the current token is received, for example, the number of monitored input messages received and having a specific header. Assuming that the SLM threshold count recorded by the appliance B equals 4, and thus, as shown by Table 410 of FIG. 4, related data of the token is updated according to the local statistics recorded by appliance B, namely the SLM threshold count, the current throughput, and the processing count. As a result, the SLM threshold count of the token increases from the current SLM threshold count (5) of the token to 9 (=5+4). As regards appliance B, the current throughput (30) in the token form is updated to be 40, because current throughput of appliance B equals 40. Upon receipt of a token, the processing count, which is defined as the number of instances an appliance has received and updated a token, increases from 3 to 4.

At the end of the updating step, the appliance B resets its own SLM threshold count to zero and then starts counting anew.

Step 340: passing the token to the next appliance most likely to reach a threshold of a monitored indicator. According to an embodiment of the present invention, what this step actually does is to pass the token to the next appliance having the least PC ratio. As described above, the PC ratio is the ratio of a processing count to the current throughput. Referring to Table 410 in FIG. 4, appliance A has a PC ratio of 3/50=0.06, appliance C has a PC ratio of 1/20=0.05, and appliance C has the least PC ratio, and thus the token is passed from appliance B to appliance C.

Likewise, referring to Table 420 shown in FIG. 4, after receiving a token, appliance C retrieves from the token the accumulated threshold count previously collected by appliance B, that is, the current SLM threshold count (=9) of the token. Assuming that the SLM threshold count recorded by appliance C equals 1, hence, referring to Table 420 in FIG. 4, appliance C updates related data of the token according to local statistics recorded by appliance C, namely an SLM threshold count, a current throughput, and a processing count. As a result, the SLM threshold count of the token increases from the previous current SLM threshold count (9) of the token to 10 (=9+1). As indicated by the token form, the current throughput (20) of appliance C updates to 10, because the current throughput of appliance C equals 10, whereas the processing count of tokens increases from 1 to 2 upon receipt of a token.

Similarly, referring to Table 420 in FIG. 4, appliance A has a PC ratio of 3/50=0.06, appliance B has a PC ratio of 4/40=0.1, and appliance A has the least PC ratio, and thus the token is passed from appliance C to appliance A.

It is advisable to selectively pass the token to the next appliance that has the least PC ratio such that the PC ratios of all the appliances are as equal as possible to thereby enable all the appliances to meet commensuration standards and update their respective statuses almost only in accordance with the current throughput.

Multi-Token

In case there are plenty of appliances in a cluster, the use of just a single token is unfit to instantly update the global SLM data carried by a token, thereby affecting the sharing and precise implementation of an SLM strategy.

Figure 5A:
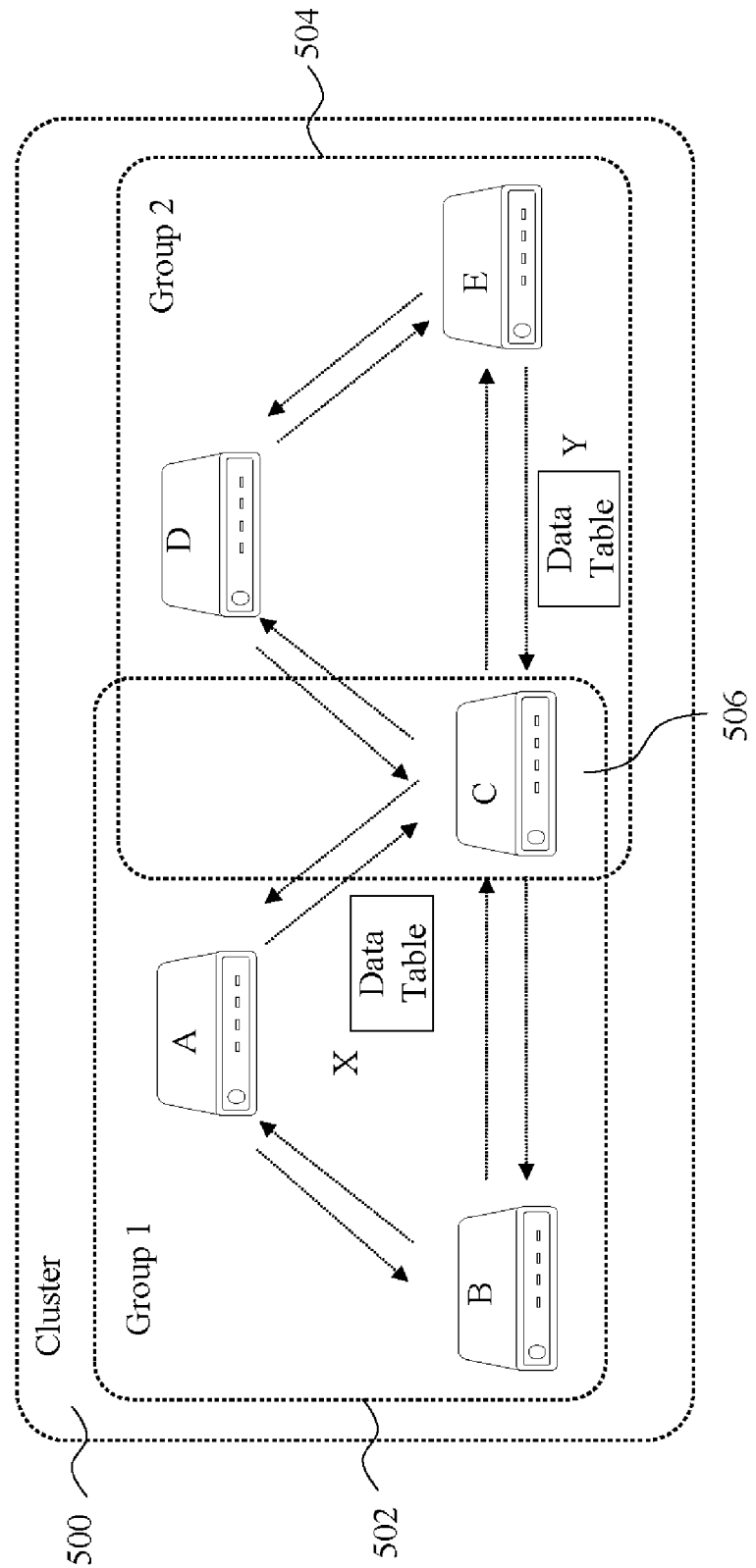
FIGS. 5a, 5d are schematic views of transmitting a multi-token between all the appliances in the same SLM cluster according to the second embodiment of the present invention.
Figure 5D:
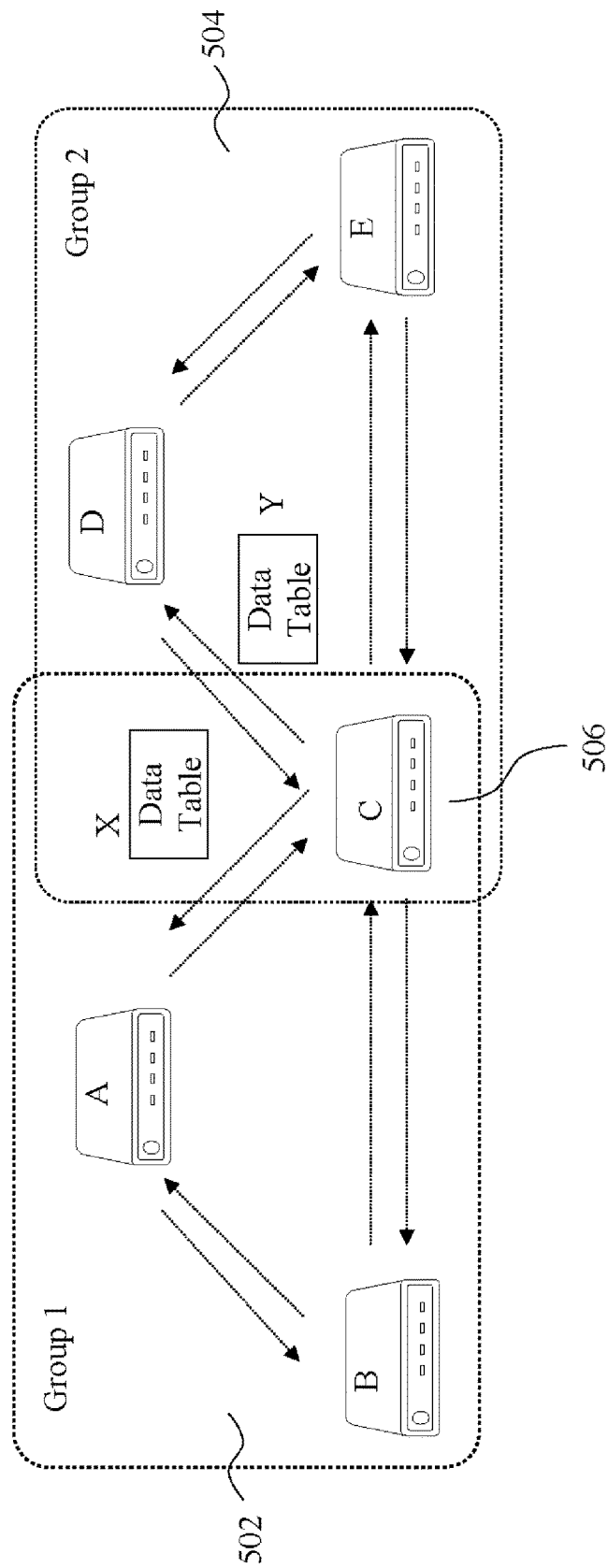

Referring to FIG. 5a and FIG. 5d, there are shown schematic views of transmitting a multi-token between all the appliances in the same SLM cluster according to the second embodiment of the present invention. Referring to FIG. 5b and FIG. 5c, there are shown tables of examples of transmitting a multi-token between appliances in a cluster according to the second embodiment of the present invention. The second embodiment of the present invention is described below and illustrated with FIGS. 5b-5c and FIGS. 5a-5d.

FIG. 5a shows that an SLM cluster 500 contains five appliances (A, B, C, D, E). The SLM cluster 500 is divided into two groups 502, 504. Groups 502, 504 use token X and token Y, respectively, to enable exchange of SLM data (SLM threshold count). Appliance C is an intersection appliance 506 of two groups 502, 504 and is known as a lead appliance. Initially, token X and token Y are sent from the lead appliance.

Table 510

Referring to Table 510 in FIG. 5b, presumably, in group 502, appliance B is currently passing token X to appliance A. Once appliance A receives token X, the accumulated threshold count collected by appliance B, that is, the current SLM threshold count (=5) of the token, will be retrieved from token X, assuming that the SLM threshold count recorded by appliance A equals 4.

Appliance A updates related data of the token with local statistics recorded by appliance A, namely an SLM threshold count, a current throughput, and a processing count. As a result, the SLM threshold count of the token increases from the previous current SLM threshold count (5) of the token to 9 (=5+4). As shown in the token form, the current throughput (30) of appliance A updates to 40, because the current throughput of appliance A is 40. The processing count, which is defined as the number of instances an appliance has received and updated a token, increases from 3 to 4 upon receipt of a token. Appliance C has the least PC ratio (6/50=0.12), and thus the token X is passed from appliance A to appliance C.

Table 520

Referring to Table 520 of FIG. 5b, presumably, in group 504, appliance D is currently passing token Y to appliance E. Once appliance E receives token Y, the accumulated threshold count collected by appliance D, that is, the current SLM threshold count (=4) of the token, will be retrieved from the token Y, assuming that the SLM threshold count recorded by the appliance E equals 1.

Appliance E updates related data of the token with local statistics recorded by appliance E, namely an SLM threshold count, a current throughput, and a processing count. As a result, the SLM threshold count of the token increases from the previous current SLM threshold count (4) of the token to 5 (=4+1). As shown in the token Y form, the current throughput (20) of appliance E updates to 10, because the current throughput of appliance E equals 10. The processing count, which is defined as the number of instances an appliance has received and updated a token, increases from 1 to 2 upon receipt of a token. Appliance C has the least PC ratio (3/50=0.06), and thus the token Y is passed from appliance E to appliance C.

Table 530

Referring to Table 530 of FIG. 5c, as described above, in group 502, token X is passed from appliance A to appliance C, whereas, in group 504, token Y is passed from appliance E to appliance C. Hence, appliance C receives token X and token Y. Appliance C retrieves from token X the accumulated threshold count collected by appliance A, that is, the current SLM threshold count (=9) of the token, and retrieves from token Y the accumulated threshold count collected by appliance E, that is, the current SLM threshold count (=5) of the token, assuming that the SLM threshold count recorded by the appliance C equals 3. As a result, the SLM threshold count of the token increases from the previous current SLM threshold count (9) of the token to 17 (=9+5+3).

Appliance C updates related data of token X with local statistics recorded by appliance C, namely an SLM threshold count, a current throughput, and a processing count. Related data of the token X is updated with a processing count and the current throughput carried by token Y and related to appliances D, E.

As a result, as shown in the token X form, the current throughput (50) of appliance C updates to 30, because the current throughput of appliance C equals 30. As shown in the token X form, a processing count and the current throughput of appliances D, E are updated to become a processing count and the current throughput carried by the token Y and related to appliances D, E, respectively.

The processing count, which is defined as the number of instances an appliance has received and updated a token, increases from 6 to 7 upon receipt of the token X. Since token X is passed between appliances A, B, C only, only one of appliances A, B, C having the least PC ratio is chosen to be the next target to receive the token thus passed. Appliance A has the least PC ratio (4/40=0.1), and thus the token is passed from appliance C to appliance A.

Table 540

Referring to Table 540 of FIG. 5c, as described above, in group 502, token X is passed from appliance A to appliance C, whereas, in group 504, token Y is passed from appliance E to appliance C. Hence, appliance C receives token X and token Y. Appliance C retrieves from token Y the accumulated threshold count collected by appliance E, that is, the current SLM threshold count (=5) of the token, and retrieves from token X the accumulated threshold count collected by appliance A, that is, the current SLM threshold count (=9) of the token, assuming that the SLM threshold count recorded by the appliance C equals 3. As a result, the SLM threshold count of the token increases from the previous current SLM threshold count (5) of the token to 17 (=5+9+3).

Appliance C updates related data of the token Y with local statistics recorded by appliance C, namely an SLM threshold count, a current throughput, and a processing count. A processing count and the current throughput carried by the token X and related to appliances A, B are updated to related data of the token Y.

As a result, as shown in the token Y form, the current throughput (50) of appliance C updates to 30, because the current throughput of appliance C equals 30. As shown in the token Y form, a processing count and the current throughput of appliances A, B are updated to become a processing count and the current throughput carried by the token X and related to appliances A, B, respectively.

The processing count, which is defined as the number of instances an appliance has received and updated a token, increases from 3 to 4 upon receipt of the token Y. Since token Y is passed between appliances C, D, E only, one of appliances C, D, E having the least PC ratio is chosen to be the next target to receive the token thus passed. Appliance D has the least PC ratio (4/40=0.1), and thus the token is passed from appliance C to appliance D.

In an embodiment of the present invention, to ensure that an SLM strategy can be implemented precisely, the transactions received (such as input messages) are fully stored in an SLM buffer when the current SLM threshold count (i.e., global SLM data) in a cluster approximates to a predetermined SLM threshold or when there is an unusual increase in current throughput (abnormal traffic surge), such that the received transactions are processed only after the predetermined SLM threshold has been reached to thereby require an appropriate response be made according to the SLM strategy. In another embodiment of the present invention, a second threshold lower than the predetermined SLM threshold is configured and adapted to determine that the current SLM threshold count (i.e., global SLM data) approximates to the predetermined SLM threshold.

The present invention is applicable to a wide variety of network apparatuses which support service level monitoring (SLM). The present invention is also applicable to conventional free member traffic monitoring in network service levels, in the situation where a network service only allows limited, concurrent free member connection or only provides the total traffic of concurrent connection of all the free members.

Thus, as described herein, According to the present invention, a token is transmitted between all the appliances in the same SLM cluster. The token carries global SLM data and loading distribution information, such that the owner of each token can implement an SLM strategy expectedly and hand over the token to the next appliance most likely to reach a threshold of a monitored indicator. According to an embodiment of the present invention, the global SLM data comes in the form of a threshold of a monitored indicator, that is, an SLM threshold count (TC), whereas the loading distribution refers to the current throughput (TPS) of messages of each appliance. In the embodiment, the token is routed to the appliance having the least PC ratio according to the loading distribution information and SLM data. The PC ratio is defined as the ratio of a processing count to the current throughput. An appliance of a lower PC ratio either has higher message throughput than the other appliances or has not received any token for a while and thus its processing count remains low. The rationale of this embodiment of the present invention is to allow an appliance of higher throughput to process the token more often than the other appliances, because higher throughput has much more influence on the accumulated throughput of appliances in a cluster. It is advisable to selectively pass the token to the next appliance that has the least PC ratio such that the PC ratios of all the appliances are as equal as possible to thereby enable all the appliances to meet commensuration standards and update their respective statuses almost only in accordance with the current throughput.

According to an embodiment of the present invention, a method for synchronizing SLM statuses of a plurality of appliances in a cluster, the method comprising the steps of:
  receiving a token, the token comprising a global SLM data and loading distribution information;
  retrieving the global SLM data of the received token;
  updating the token with local statistics; and
  passing the token to a next appliance.

According to another embodiment of the present invention, a computer program product comprising a computer-readable medium having a code stored therein for executing the aforesaid method on a plurality of appliances in a cluster, thereby synchronizing SLM statuses of the plurality of appliances in the cluster.

According to another embodiment of the present invention, an appliance, comprising:
  a bus;
  a memory connected to the bus, the memory comprising an instruction; and
  a processing unit connected to the bus, wherein the processing unit executes the instruction to thereby execute the aforesaid method, thereby synchronizing SLM statuses of a plurality of appliances in a cluster.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for synchronizing Service Level Monitoring (SLM) statuses of a plurality of appliances in a cluster, the method comprising:
    receiving, from a first appliance in a cluster, a token at a second appliance in the cluster, wherein the token comprises global Service Level Monitoring (SLM) data and loading distribution information, wherein the token is associated with a message, and wherein the token and the message are transmitted via a high-speed serial bus from the first appliance to the second appliance;
    retrieving, by the one or more processors, the global SLM data and the loading distribution information from the token that has been received by the second appliance, wherein the global SLM data is a threshold count of a monitored indicator, wherein the monitored indicator describes a quantity of input messages having a specific header previously received by each appliance in the cluster, and wherein the loading distribution information describes a current throughput of messages of each appliance in the cluster;
    updating, by the one or more processors, the token with local statistics for the second appliance in order to synchronize SLM statuses of the first appliance and the second appliance, wherein the token contains combined SLM data for the first appliance and the second appliance, wherein the local statistics comprises an SLM threshold count, a current throughput, and a processing count of an appliance receiving the token, and wherein the processing count is a number of instances each appliance in the cluster has received and updated the token;
    passing, by the one or more processors, the token and the message from the second appliance to a third appliance in the cluster and updating the token at the third appliance, wherein the token contains current throughput information for the first appliance, wherein the token contains current throughput information for the second appliance, and wherein the token contains current throughput information for the third appliance;
    selectively passing, by the one or more processors, the token and the message from the third appliance to a next appliance that is most likely to reach the threshold count of the monitored indicator;
    selectively passing, by the one or more processors, the token and the message from the next appliance that is most likely to reach the threshold count of the monitored indicator to an appliance having a least PC ratio, wherein a PC ratio is a ratio of a processing count of a particular appliance to a current throughput of the particular appliance; and
    in response to an accumulated threshold count of the monitored indicator reaching a predetermined threshold, executing, by the one or more processors, a specified action on transactions received by a plurality of appliances in the cluster, wherein the specified action comprises selectively queuing, rejecting, or passing the transactions received by the plurality of appliances in the cluster, and wherein the accumulated threshold count is an accumulated total of the monitored indicator for all appliances in the cluster.

2. A computer program product embodied on a non-transitory computer readable storage medium for synchronizing Service Level Monitoring (SLM) statuses of a plurality of appliances in a cluster, the non-transitory computer readable storage medium having program code embodied therewith, the program code readable and executable by a processor to perform a method comprising:
    receiving, from a first appliance in a cluster, a token at a second appliance in the cluster, wherein the token comprises global Service Level Monitoring (SLM) data and loading distribution information, wherein the token is associated with a message, and wherein the token and the message are transmitted via a high-speed serial bus from the first appliance to the second appliance;
    retrieving the global SLM data and the loading distribution information from the token that has been received by the second appliance, wherein the global SLM data is a threshold count of a monitored indicator, wherein the monitored indicator describes a quantity of input messages having a specific header previously received by each appliance in the cluster, and wherein the loading distribution information describes a current throughput of messages of each appliance in the cluster;
    updating the token with local statistics for the second appliance in order to synchronize SLM statuses of the first appliance and the second appliance, wherein the token contains combined SLM data for the first appliance and the second appliance, wherein the local statistics comprises an SLM threshold count, a current throughput, and a processing count of an appliance receiving the token, and wherein the processing count is a number of instances each appliance in the cluster has received and updated the token;
    passing the token and the message from the second appliance to a third appliance in the cluster and updating the token at the third appliance, wherein the token contains current throughput information for the first appliance, wherein the token contains current throughput information for the second appliance, and wherein the token contains current throughput information for the third appliance;

selectively passing the token and the message from the third appliance to a next appliance that is most likely to reach the threshold count of the monitored indicator;

selectively passing the token and the message from the next appliance that is most likely to reach the threshold count of the monitored indicator to an appliance having a least PC ratio, wherein a PC ratio is a ratio of a processing count of a particular appliance to a current throughput of the particular appliance; and in response to an accumulated threshold count of the monitored indicator reaching a predetermined threshold, executing a specified action on transactions received by a plurality of appliances in the cluster, wherein the specified action comprises selectively queuing, rejecting, or passing the transactions received by the plurality of appliances in the cluster, and wherein the accumulated threshold count is an accumulated total of the monitored indicator for all appliances in the cluster.

3. A computer system comprising:

a processor;

a memory coupled to the processor, the memory comprising instructions that, when executed by the processor, cause the computer system to:

receive, from a first appliance in a cluster, a token at a second appliance in the cluster, wherein the token comprises global Service Level Monitoring (SLM) data and loading distribution information, wherein the token is associated with a message, and wherein the token and the message are transmitted via a high-speed serial bus from the first appliance to the second appliance;

retrieve the global SLM data and the loading distribution information from the token that has been received by the second appliance, wherein the global SLM data is a threshold count of a monitored indicator, wherein the monitored indicator describes a quantity of input messages having a specific header previously received by each appliance in the cluster, and wherein the loading distribution information describes a current throughput of messages of each appliance in the cluster;

update the token with local statistics for the second appliance in order to synchronize SLM statuses of the first appliance and the second appliance, wherein the token contains combined SLM data for the first appliance and the second appliance, wherein the local statistics comprises an SLM threshold count, a current throughput, and a processing count of an appliance receiving the token, and wherein the processing count is a number of instances each appliance in the cluster has received and updated the token;

pass the token and the message from the second appliance to a third appliance in the cluster and update the token at the third appliance, wherein the token contains current throughput information for the first appliance, wherein the token contains current throughput information for the second appliance, and wherein the token contains current throughput information for the third appliance;

selectively pass the token and the message from the third appliance to a next appliance that is most likely to reach the threshold count of the monitored indicator;

selectively pass the token and the message from the next appliance that is most likely to reach the threshold count of the monitored indicator to an appliance having a least PC ratio, wherein a PC ratio is a ratio of a processing count of a particular appliance to a current throughput of the particular appliance; and in response to an accumulated threshold count of the monitored indicator reaching a predetermined threshold, execute a specified action on transactions received by a plurality of appliances in the cluster, wherein the specified action comprises selectively queuing, rejecting, or passing the transactions received by the plurality of appliances in the cluster, and wherein the accumulated threshold count is an accumulated total of the monitored indicator for all appliances in the cluster.

* * * * *